US 6,553,876 B2

(12) United States Patent
Hochuli et al.

(10) Patent No.: US 6,553,876 B2
(45) Date of Patent: Apr. 29, 2003

(54) DETACHABLE, HIGH PRECISION AND RIGID CONNECTION OF A TOOL, WORKPIECE OR GAUGE HOLDER TO THE NOSE OF A MACHINE TOOL SPINDLE

(75) Inventors: Peter Hochuli, Volketswil (CH); Giorgio Scacchi, Hinwil (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/895,311

(22) Filed: Jul. 2, 2001

(65) Prior Publication Data

US 2002/0000140 A1 Jan. 3, 2002

(30) Foreign Application Priority Data

Jul. 1, 2000 (DE) .......................................... 100 32 073

(51) Int. Cl.⁷ .......................... B23B 19/02; B23B 25/06
(52) U.S. Cl. .......................................... 82/147; 82/151
(58) Field of Search .......................... 82/147, 151, 150, 82/162, 164, 165, 168, 173; 279/901, 133; 408/238; 409/232, 234; 483/20; 403/11, 13, 334; 285/24, 332, 334.1, 412

(56) References Cited

U.S. PATENT DOCUMENTS

| | | | | |
|---|---|---|---|---|
| 2,828,672 A | * | 4/1958 | McMullen | 407/20 |
| 3,041,898 A | * | 7/1962 | Better | 279/16 |
| 3,521,511 A | * | 7/1970 | Deuring et al. | 279/901 |
| 3,610,643 A | * | 10/1971 | Thompson | 242/573 |
| 4,151,767 A | * | 5/1979 | Szush, Jr. | 82/150 |
| 4,204,787 A | * | 5/1980 | McCray et al. | 407/49 |
| 5,215,417 A | * | 6/1993 | Ball et al. | 409/232 |
| 5,915,896 A | * | 6/1999 | Koczarski et al. | 279/133 |

* cited by examiner

*Primary Examiner*—A. L. Wellington
*Assistant Examiner*—Brian D Walsh
(74) *Attorney, Agent, or Firm*—Browdy and Neimark, P.L.L.C.

(57) ABSTRACT

Interface between the spindle nose (1) and the fixture flange (11) of interchangeable tool, gauge or workpiece holder (7) of a machine tool with a shortened centring taper (8) on the underside of the flange of the holder (7), said taper being formed as an axially and radially rigid but in circumference elastically expansible tubular stub (15), which due to its elastic properties adapts itself to the diameter of the centring taper (6) on the spindle nose (1).

10 Claims, 2 Drawing Sheets

Figure 2:
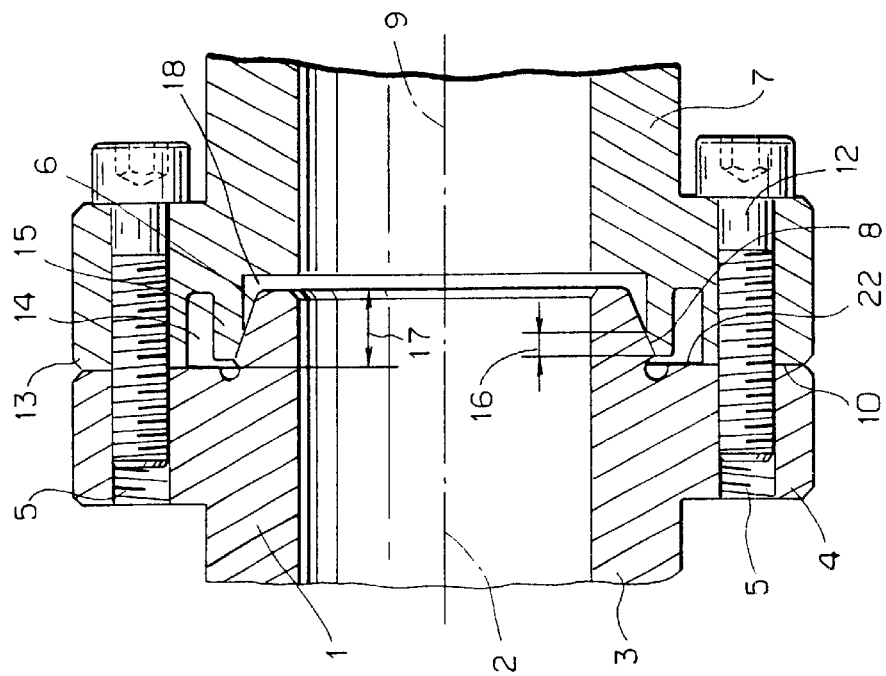

DETACHABLE, HIGH PRECISION AND RIGID CONNECTION OF A TOOL, WORKPIECE OR GAUGE HOLDER TO THE NOSE OF A MACHINE TOOL SPINDLE

The invention relates to the detachable connection of a tool, workpiece or gauge holder to the nose of a machine tool spindle. In order to achieve short re-setting times on modern precision machine tools of high output performance, the interface points between the machine and the holders of the workpiece specific cutting tools, gauges or workpieces must be designed such that a change-over can be carried out in the shortest possible time and with maximum positioning accuracy either manually or automatically, whilst the connection must have the rigidity and capacity of transmission for the occurring forces and torques.

An interface that fulfils these requirements to a high degree is the flange connection with centring taper and flange location of the kind described in DIN 55026 or 55028. It is formed by the short female and male taper on the flange of the tool or workpiece holder and on the spindle nose respectively for the radial centring, and by the flange faces at right angles to the axis of rotation of the spindle for the facial alignment of the tool or workpiece holder relative to the spindle, which are brought to bear against each other on assembly by way of bolts or other means of fixture. In order to assure a positive seating in the radial direction, the male taper (spigot) of the spindle nose is of a slightly larger dimension than the female taper of the tool or workpiece holder, so that as the flanges are pulled together the play between the tapered ends is eliminated and the latter are subjected to a slight radial elastic deformation.

A disadvantage of this connection lies in the high manufacturing accuracy which must be observed in order to assure the positioning accuracy and rigidity of the connection. If the close tolerances of the taper angle and taper diameter are transgressed, there is danger of radial and axial errors due to radial play between the male and female tapers, or due to inadequate axial contact between the flanges. If an attempt is made to nevertheless bring the flange faces into contact—by excessive tightening of the fixture bolts for example—then there is a danger of elastically deforming the spindle nose, which can jeopardise the true running of the spindle. Moreover in the case of frequent assembly and dismantling, a too high pressure of contact on the centring taper risks premature wear and a loss of positioning accuracy.

The object of the invention is to introduce a connection with which the high positioning accuracy and rigidity of the flange connection can always be assured without the risk of undesirable elastic deformation, even in the case of wide manufacturing tolerances and hence low manufacturing costs of the flange components, and premature wear can be avoided. The objective is attained by way of the characteristic features in accordance with the claims.

Figure 1:
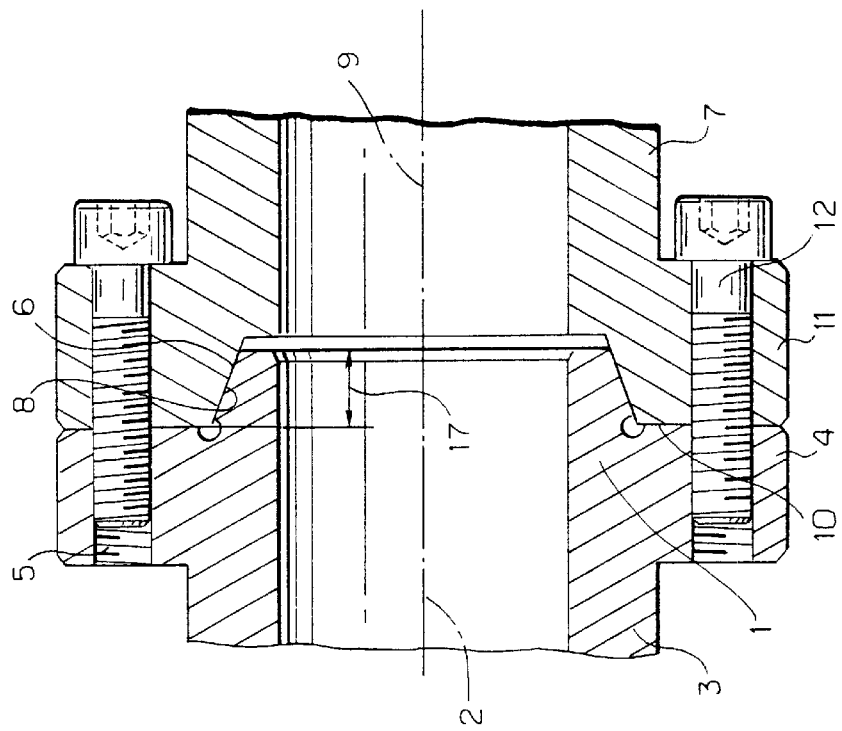
Figure 4:
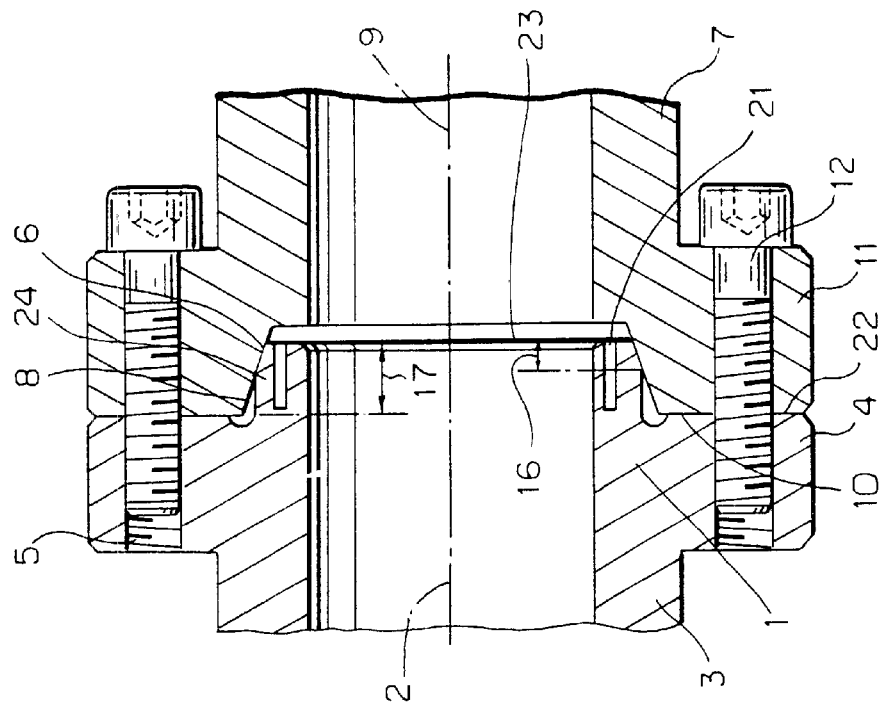
Figure 3:
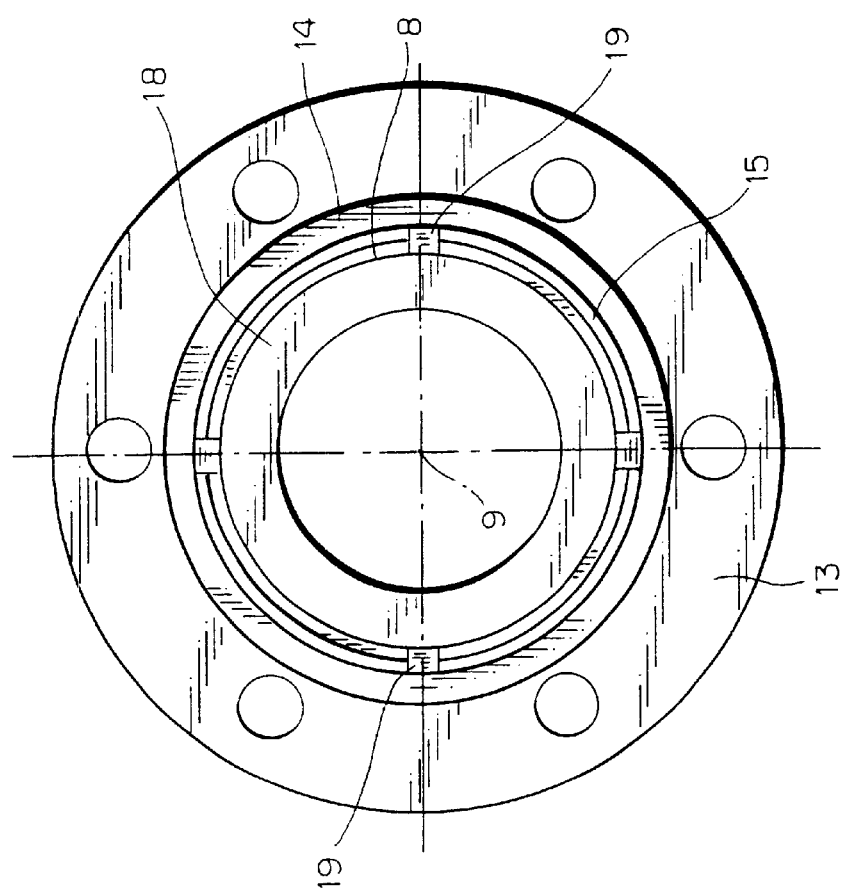

In the following the invention is described in detail by the example of the fixture of the workpiece holder of a gear flank grinding machine to the nose of the work spindle, referring to the drawings. These depict:

FIG. 1 the spindle nose and the fixture flange of the workpiece holder in the design according to the present technical state of the art, FIG. 2 the fixture flange according to one embodiment of the invention, FIG. 3 a variant of the fixture flange shown in FIG. 2, and FIG. 4 the kinematic inversion of the embodiment according to FIG. 2.

FIG. 1 shows the nose 1 of the work spindle 3 of a gear grinding machine, rotating about the spindle axis 2. The nose consists of the spindle flange 4 at right angles to the spindle axis 2 with tapped holes 5 arranged concentrically around and parallel to the spindle axis 2, and the centring taper (spigot) 6 coaxial to the spindle axis 2. Flange 4 and centring taper 6 of the spindle nose 1 serve to accommodate the workpiece holder 7, which is centred via its female taper 8 on the male taper 6 of the spindle nose (1), and the location surface 10 of whose flange 11 is at right angles to the axis 9 of the centring taper 8 and after tightening the fixture screws 12 bears all round on the location surface 22 of the flange 4 of the spindle nose 1.

As is easily seen, the rigid nature of the spindle nose 1 and of the flange 11 in FIG. 1 demands a high degree of manufacturing accuracy, in order to avoid inadequate flange contact or play, or too high a pressure of contact on the centring tapers and thus premature wear and accuracy loss.

In FIG. 2 the spindle nose of FIG. 1 has been taken over unaltered. On the other hand, in the diameter zone outside the centring taper 8 the flange 13 of the tool holder 7 is provided according to the invention with an axial recess 14 coaxial to the axis of rotation 9. Furthermore, the centring paper taper 8 is counter-bored to provide a bore 18, such that the height 16 of the remaining centring taper 8 is only a fraction of the height 17 of the centring taper 6 of the spindle nose 1. The root zone of the female centring taper 8 thereby takes on the form of a thin walled axially and radially rigid, but in its diameter elastically expansible, tubular stub 15.

The shortening of the taper 8 to the height 16 and its positioning at the end of the tubular stub 15 effect the expanding of the tubular stub with the smallest possible force, and hence reduce the wear.

FIG. 3 shows a design of the fixture flange 13 according to the invention in which for increased elasticity the tubular stub 15 is provided with radial slots 19 around its circumference to a depth of no more than the depth of the recess 14.

By the design of the underside of the flange of the tool holder 7 according to the invention, it is achieved that in case of substantial deviation off the specified dimension the elasticity of the centring taper 8 allows its diameter to adapt to the taper diameter of the spindle nose 1 without excessive tightening of the flange bolts 12 and possibly thus caused deformation of the spindle nose 1, and hence always assures that the flanges 4 and 13 make plane contact. It simultaneously means that in spite of exact centralizing, the pressure of contact between the male and female tapers, and hence the wear of the mating taper surfaces, can be kept within low limits. With the often very short intervals of re-set up tools and work fixtures on modern universal machine tools of high output performance, this assures the retaining of the positioning accuracy of the interface over a long period of service.

A further form of application of the invention concept shown in FIG. 4 is possible in that instead of adapting the female taper 8 of the tool or workpiece holder flange 13 in the manner of the invention, the same effect is achieved by lending the male taper 6 of the spindle nose 1 a tubular stub form. The advantage of the embodiments illustrated in FIGS. 2 and 3, however, is that the invention can be exploited without restriction on machines already operating with spindle noses according to FIGS. 1 and 2.

In the design form according to FIG. 4 the axial annular recess or slot 21 in the spindle nose 1 runs coaxial to the centring taper 6. The axial depth of the slot 21 corresponds approximately with the distance 17 between the plane location surface 22 of the flange 4 and the end face 23 of the tubular stub 24 on which the centring taper 6 is formed. The axial length of the centring taper 6 is about 20% to 50% of this distance 17.

The wall thickness of the tubular stub 15 (FIGS. 2 and 3) or 24 (FIG. 4) is less than half the length of the stub 15, 24.

What is claimed is:

1. Detachable, high precision and rigid connection of a tool, workpiece or gauge holder (7) with a spindle nose (1) of a machine tool spindle (3), comprising a first centring taper (6) on the spindle nose (1) and a first plane location surface (22) on the spindle nose (1), on the holder (7) a second centring taper (8) for mating with the first centring taper (6) and a second plane location surface (10) for mating with the first location surface (22), characterized in that one of the centring tapers (6, 8) is formed on a tubular stub (15, 24) and that the axial length (16) of this centring taper (6, 8) is 20% to 50% of the axial length of the tubular stub (15, 24) in such a manner that this centring taper (6, 8) is circumferentially elastic.

2. Connection according to claim 1, characterized in that in the holder (7) an annular recess is provided coaxial to the second centring taper (8) of a depth approximately the same as the axial length (17) of the first centring taper (6), so that the second centring taper (8) is formed on the tubular stub (15), and that the holder (7) is provided with a bore (18) coaxial to the second centring taper (8) which restricts the axial length of the second centring taper (8) to 20% to 50% of the axial length of the tubular stub (15).

3. Connection according to claim 2, characterized in that the end face of the tubular stub (15) is set back short of the second location surface (10).

4. Connection according to claim 1, characterized in that in the spindle nose (1) inside the first centring taper (6) and starting at the nose end face (23) a coaxial recess (21) is provided, the depth of which approximately corresponds with the axial length of the second centring taper (8), so that the first centring taper (6) is formed on the tubular stub (24), and that the axial length of the first centring taper (6) is 20% to 50% of the axial length (16) of the tubular stub (24).

5. Connection according to any of the claims 1 to 4, characterized in that the tubular stub (15, 24) is provided with radial slots (19).

6. Connection according to claim 5, characterized in that the wall thickness of the tubular stub (15, 24) is less than its axial length.

7. Connection according to claim 4, characterized in that the wall thickness of the tubular stub (15, 24) is less than 50% of its axial length.

8. Connection according to claim 3, characterized in that the wall thickness of the tubular stub (15, 24) is less than 50% of its axial length.

9. Connection according to claim 2, characterized in that the wall thickness of the tubular stub (15, 24) is less than 50% of its axial length.

10. Connection according to claim 1, characterized in that the wall thickness of the tubular stub (15, 24) is less than 50% of its axial length.

* * * * *